(12) United States Patent
Dallos et al.

(10) Patent No.: US 7,794,020 B2
(45) Date of Patent: Sep. 14, 2010

(54) VEHICLE SEAT

(75) Inventors: Christian Dallos, Hallstadt (DE);
Andreas Höpfner, Hildburghausen (DE); Thorsten Klein-Hitpass, Hamminkeln (DE)

(73) Assignee: Brose Fahzeugteile GmbH & Co., Coburg (DE)

( * ) Notice: Subject to any disclaimer, the term of this patent is extended or adjusted under 35 U.S.C. 154(b) by 28 days.

(21) Appl. No.: 12/062,303

(22) Filed: Apr. 3, 2008

(65) Prior Publication Data
US 2009/0033136 A1 Feb. 5, 2009

(30) Foreign Application Priority Data
Apr. 5, 2007 (DE) .................. 20 2007 005 182 U

(51) Int. Cl.
*B60N 2/68* (2006.01)
(52) U.S. Cl. .................. 297/440.15; 297/452.18; 297/463.1
(58) Field of Classification Search ............ 297/452.18, 297/452.1, 353, 463.1, 463.2, 440.15
See application file for complete search history.

(56) References Cited

U.S. PATENT DOCUMENTS

| | | | | |
|---|---|---|---|---|
| 4,181,357 A | * | 1/1980 | Swenson et al. ............ 297/353 |
| 4,775,186 A | * | 10/1988 | Nishino .................. 297/367 R |
| 4,863,219 A | * | 9/1989 | Ochiai .................... 297/452.11 |
| 4,919,486 A | * | 4/1990 | Chinomi et al. .......... 297/440.2 |
| 2007/0029860 A1 | * | 2/2007 | Yamada ................. 297/440.21 |

FOREIGN PATENT DOCUMENTS

| | | |
|---|---|---|
| DE | 3915917 | 4/1990 |
| DE | 4423912 | 1/1996 |
| DE | 10128890 | 3/2002 |
| DE | 10312136 | 10/2004 |
| EP | 1606138 | 12/2005 |

* cited by examiner

*Primary Examiner*—Peter R. Brown
(74) *Attorney, Agent, or Firm*—Scott T. Weingaertner; Joseph D. Eng, Jr.; King & Spalding LLP

(57) ABSTRACT

The invention relates to a vehicle seat wherein the vehicle seat includes a back rest frame and a seat frame, which can be fastened to each other via a fitting. During assembly, mutually corresponding fastening points on the fitting and on at least one of the frame parts are brought to overlap in order to connect the two frame parts to each other with the aid of fastening elements. For the assembly, assembly aids are provided on the frame part and fitting. The assembly aids engage one inside the other in a form-fitting manner and are configured so that the two frame parts are held in an assembly aid position in which the mutually corresponding fastening points are aligned with respect to each other.

8 Claims, 4 Drawing Sheets

VEHICLE SEAT

FIELD OF THE INVENTION

The invention relates to a vehicle seat, in particular for a motor vehicle.

BACKGROUND OF THE INVENTION

Motor vehicle seats, in particular for passenger vehicles, are usually of multi-part design and have a seat and a back rest which is fastened to the seat and the inclination of which can be adjusted in relation to the seat. In this case, a frame takes on, in particular, the mechanical supporting function. A back rest frame is usually fastened to a seat frame via a fitting. A seat cushion and a back rest cushion are generally arranged on the frames. The seat frame is usually fastened in the motor vehicle to the vehicle floor via guide rails, thus enabling longitudinal adjustment. The back rest frame can be adjusted in its inclination in relation to the seat frame.

The vehicle seats are usually assembled at suppliers and supplied to the car manufacturer as premanufactured vehicle seats. The high cost pressure in the car industry means that an assembly of the individual parts of a vehicle seat which is as simple and rapid as possible is sought.

SUMMARY OF THE INVENTION

The present invention is therefore based on the object of making rapid and simple assembly of a vehicle seat possible.

The object is achieved according to the invention by a vehicle seat that comprises two frame parts, namely a back rest frame and a seat frame, which can be fastened to each other via a fitting. At least one of the frame parts, usually the seat frame, and the fitting which is preferably fastened in preassembled form to the back rest frame, have mutually corresponding fastening points. Fastening points of this type are, in particular, holes or bores through which, for example, bolts or else screws as fastening elements are passed during assembly such that the fitting and, together with it, the back rest frame are fastened to the seat frame. In the final assembly position, in which the two parts are fastened to each other via the fastening elements, the fastening points, i.e., the holes, are aligned with each other. Furthermore, in order to make simple assembly possible, assembly aids are provided on the frame part and on the fitting and form a pair of assembly aids. When assembling the back rest frame on the seat frame, these two assembly aids now engage one inside the other in a form-fitting manner such that the back rest frame and the seat frame are held relative to each other in an assembly aid position in which the mutually corresponding fastening points are aligned with each other for fastening via the fastening elements.

During the assembly, the back rest frame is pushed from above onto the seat frame in an assembly direction which essentially corresponds to the vertical direction or Z direction, and therefore the fitting, which is usually configured in the manner of a flat plate, comes to overlap with side cheeks of the seat frame. The corresponding holes are formed in the side cheeks.

An effective form-fitting connection which holds the back rest frame and the seat frame ready in an assembly aid position is formed between the two assembly aids solely by the back rest frame being placed onto the seat frame. The assembly aids are configured for this purpose as suitable structural elements which are formed directly on the frame part and on the fitting. In the assembly aid position, the frame parts are already fixed to each other in such a manner that no further holding measures are required, and the relative position between the two frame parts is fixed solely by the assembly aids. The particular advantage here is that the holes are automatically brought into a position with respect to each other by the back rest frame being placed on, and therefore the fastening elements can easily be passed through the holes.

According to a preferred refinement, the pair of assembly aids is formed by an edge recess and a transverse pin which can be displaced one inside the other essentially in the Z direction in order to form a form-fitting connection which is effective in the X direction. This is obtained by simple placing of the back rest frame onto the seat frame. The X direction is understood here as meaning the longitudinal direction of the seat frame, the Z direction the direction which is oriented perpendicularly with respect thereto and runs approximately in the longitudinal direction of the back rest frame. The transverse or Y direction is understood as meaning a direction which is oriented transversely both with respect to the X direction and with respect to the Z direction. The transverse pin which extends in the transverse direction is preferably designed as an outwardly bent tab, and the edge recess is produced, for example, by punching, with the edge recess being part of the encircling edge contour.

According to a preferred development, at least one further pair of assembly aids is provided, wherein the pairs of assembly aids form form-fitting connections which are effective in different directions. By means of this measure, the back rest frame is securely and reliably fixed to the seat frame in the assembly aid position.

The further pair of assembly aids expediently opposes a rotation of the fitting in relation to the seat frame. For this purpose, the further pair of assembly aids forms, in particular, a form-fitting connection which is effective in the Z direction. This is expediently achieved in that the pair of assembly aids is formed by a transverse tab and a stop which engage together one behind the other in the assembly aid position. In this case, the transverse tab is expediently formed by a doubled-over portion of a side wall, in particular of the frame part. The stop is, for example, a lug which is arranged on the edge of the fitting.

All in all, the pairs of assembly aids are therefore formed in a cost-effective and simple manner from the side cheeks of the frame part or from the fitting by means of doubled-over portions, outwardly bent portions and/or punched portions. Virtually no additional costs are therefore incurred for the assembly aids. By means of the secure fixing, the assembly is at the same time significantly simplified and, in particular, secure. In particular, the further pair of assembly aids prevents the back rest frame from rotation in relation to the seat frame. This is because, due to the weight, if there is a lack of fixing in the Z direction or in the direction of rotation, there would be the risk of the back rest frame, due to its dead weight, tipping forward or rearward, which, under some circumstances, may even lead to people being put at risk during the assembly.

According to a preferred development, the assembly aids are arranged with respect to the fastening points in such a manner that only upon fastening via the fastening elements are the back rest frame and the seat frame brought into a final assembly position which is at least slightly changed in relation to the assembly aid position. In the final assembly position, the assembly aids of the respective pair of assembly aids are expediently separated from each other, i.e. they no longer have any contact with each other, and are therefore decoupled from each other, in the final assembly position. This has the particular advantage that, during normal use during the operation of the motor vehicle, the assembly aids cannot strike against each other and therefore cannot lead, for example, to undesirable rattling noises, etc. This decoupling is achieved in this case by the assembly aid position and final assembly position differing from each other, i.e., during fastening via the fastening elements, a relative movement of the two frame parts with respect to each other takes place. This relative displacement is caused, for example, by, in the assembly aid position, the individual fastening holes not being aligned exactly with one another, i.e. their central center axes do not lie on a common line, but rather are arranged offset and/or at an angle with respect to one another. However, the offset here is dimensioned in such a manner that a fitting of the fastening bolts, such as, for example, fastening screws, continues to be possible. During the tightening of the fastening screws, the offset of the center axes of the holes then causes the relative movement which then leads to the decoupling of the assembly aids.

DETAILED DESCRIPTION

Figure 1:
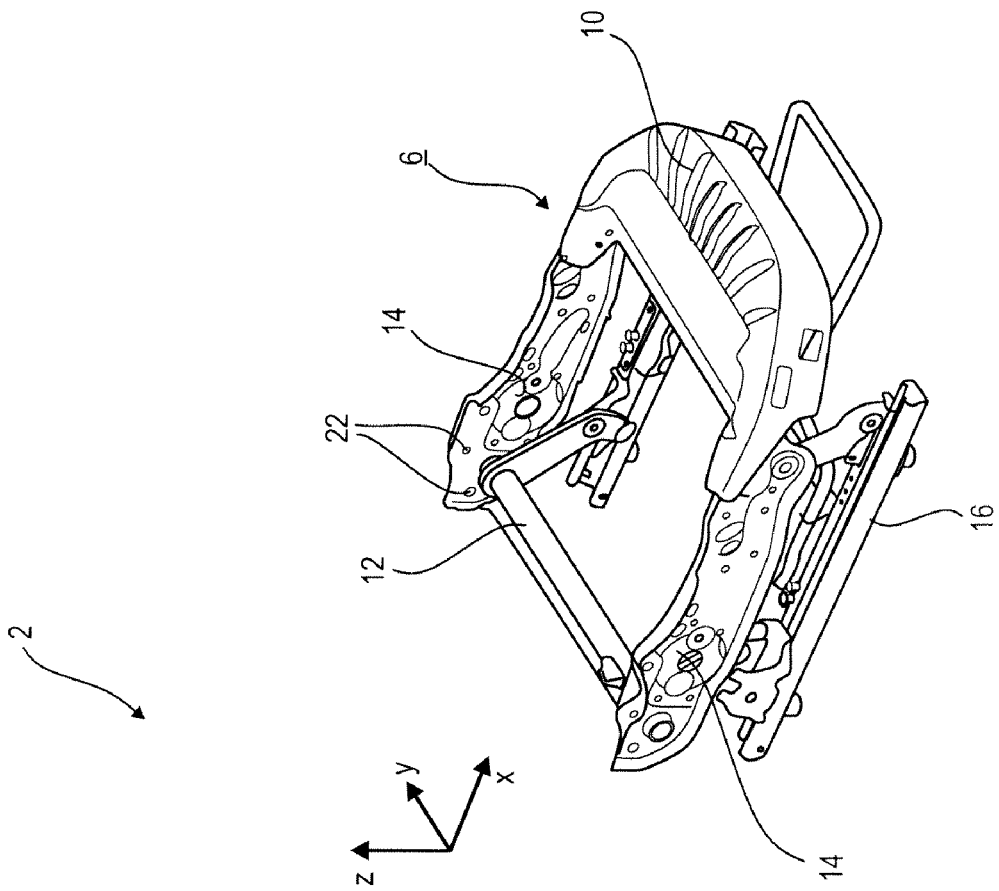
FIG. 1 shows a supporting frame of a vehicle seat in the manner of an exploded illustration, comprising a back rest frame and a seat frame.
Figure 1:
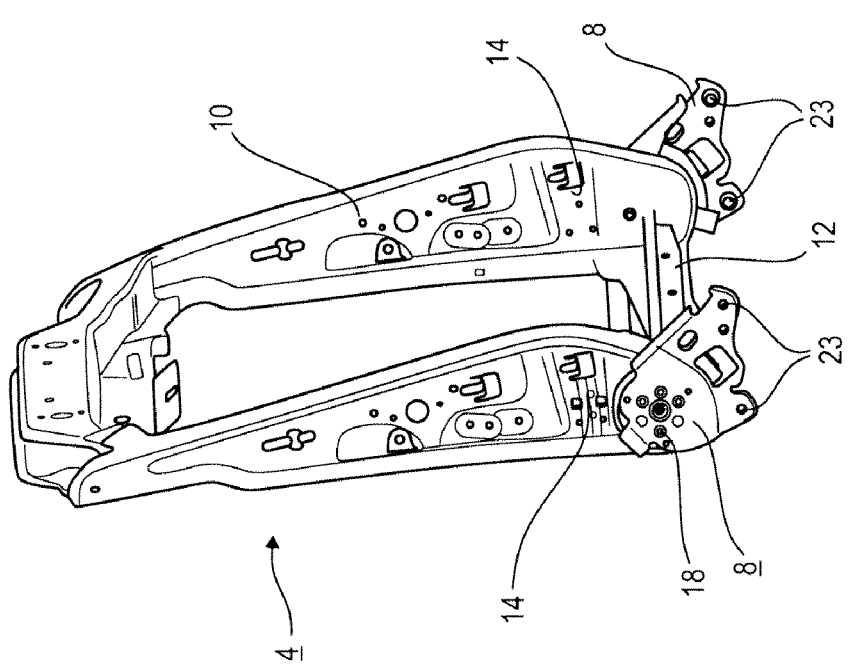

The supporting frame of a vehicle seat 2 for a passenger vehicle can be seen in FIG. 1. The vehicle seat 2 comprises a back rest frame 4 and a seat frame 6 which, during assembly, are connected to each other with the aid of a fitting 8. The fitting 8 is fastened in preassembled form to the back rest frame 4. In the exemplary embodiment, the fitting 8 is designed in the manner of a separate adapter plate.

In the exemplary embodiment, the two frame parts 4, 6 comprise an encircling supporting frame 10 which is usually formed from metal and ensures the necessary stability for the vehicle seat 2. In the connecting region, i.e., in the lower region of the back rest frame 4, and in the rear region of the seat frame 6, a respective cross piece 12 is provided on the back rest frame 4 and on the seat frame 6. Said cross piece in each case connects two edge-side cheeks 14 to each other. The side cheeks 14 here are of essentially flat design and, in particular, are formed from a flat steel which has been brought into a desired contour, for example, by means of bending and punching operations.

The fitting 8, which is of essentially plate-like design and has usually likewise been produced from a flat steel by means of punching and deforming operations, is provided in order to connect the two frame parts 4, 6 to each other.

The seat frame 6 furthermore comprises a rail guide 16. The latter has an upper rail and a lower rail. The lower rail is connected fixedly to a vehicle floor, and the upper rail can be displaced in the lower rail in order to longitudinally adjust the seat in the longitudinal direction (X direction). In addition, in the assembled final state, the inclination of the back rest frame 4 can be adjusted in relation to the seat frame 6.

For the assembly of the back rest frame 4 on the seat frame 6, the back rest frame 4 is usually placed from above onto the seat frame 6 approximately in the Z direction (vertical direction). In the process, the fittings 8, which are attached laterally and are preassembled on the back rest frame 4 by means of a plurality of screws 18, are pushed laterally along the side cheeks 14 of the seat frame 6. By this means, the back rest frame 4 is guided and aligned in the transverse or Y direction relative to the seat frame 6. The fittings 8 here therefore provide a certain simplification of assembly; in particular, they guide the back rest frame 4 as it is being placed onto the seat frame 6.

Furthermore, for the fastening via bolts or screws (not illustrated here), mutually assigned fastening points, which are designed as holes 22, 23 in the exemplary embodiment, on the fitting 8 and on the seat frame 6 have to be brought to overlap. In the case of conventional frame parts 4, 6, precise positioning has previously had to be carried out manually, so that the screws can be guided through the holes 22, 23 which are then aligned with each other. This sometimes proves difficult or at least time-consuming, not least because of the dead weight of the back rest frame 4.

Figure 2:
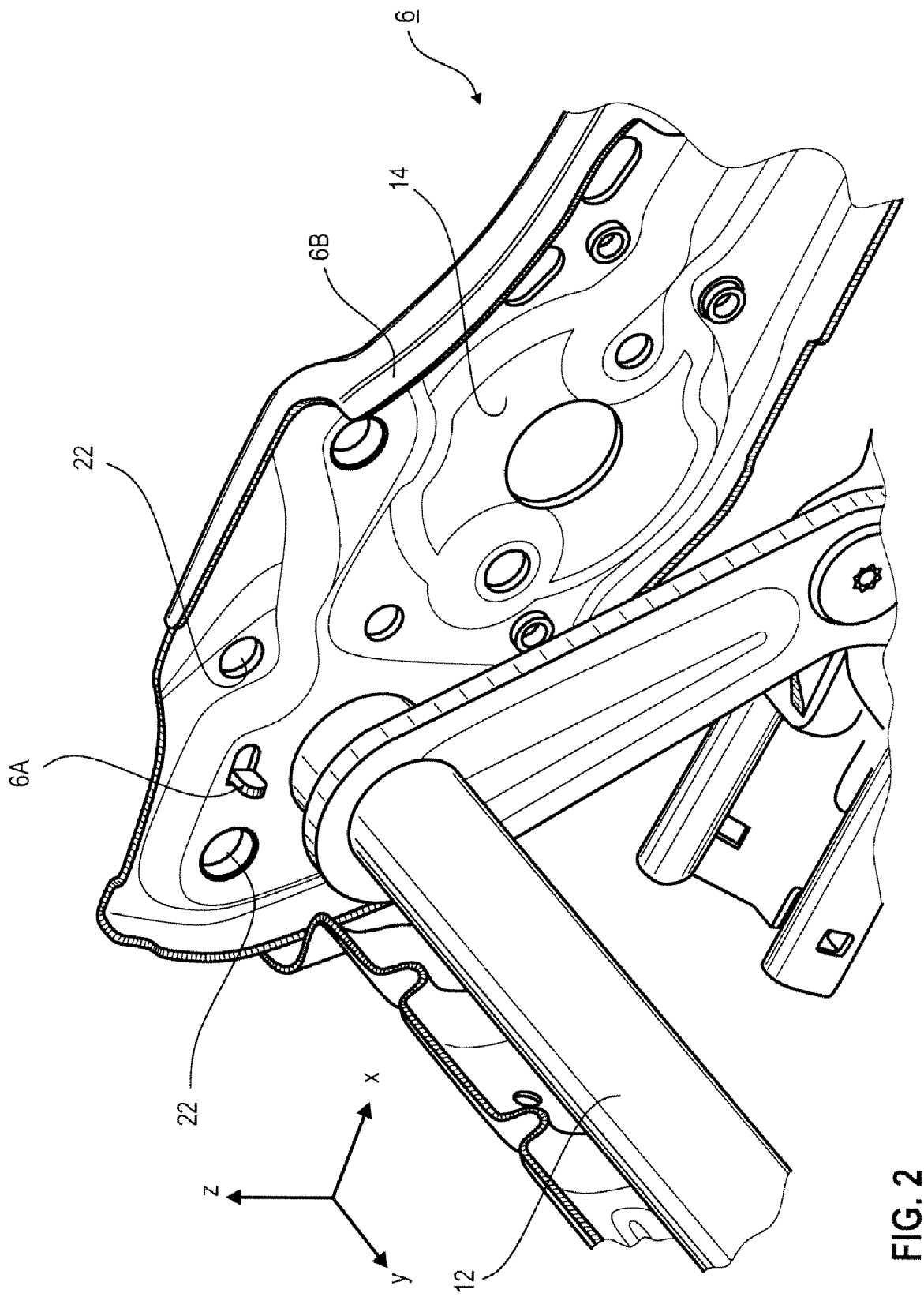
FIG. 2 shows a partial illustration of the seat frame.
Figure 3:
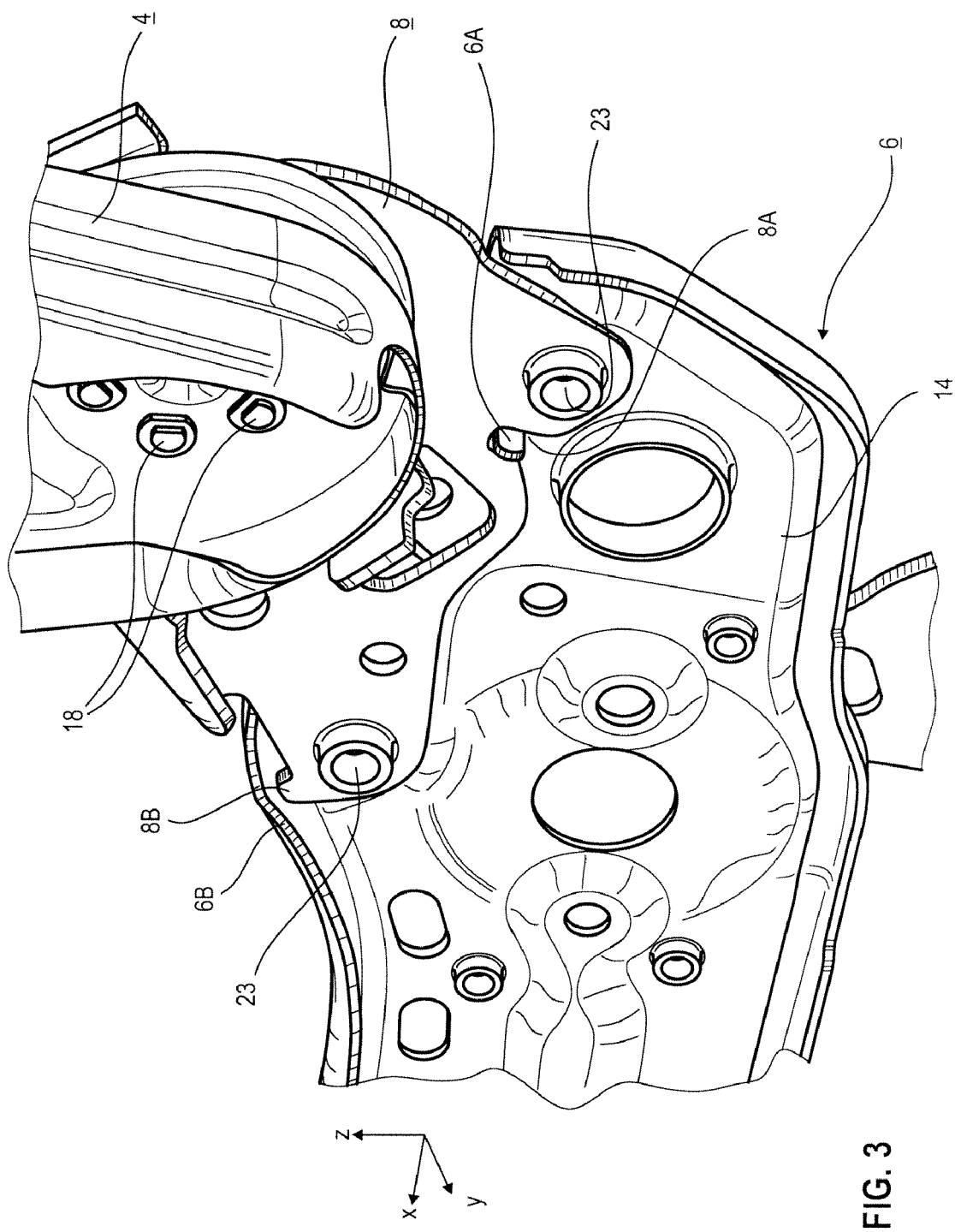
FIG. 3 shows a partial illustration of the seat frame together with the back rest frame, which are situated with respect to each other in an assembly aid position.
Figure 4:
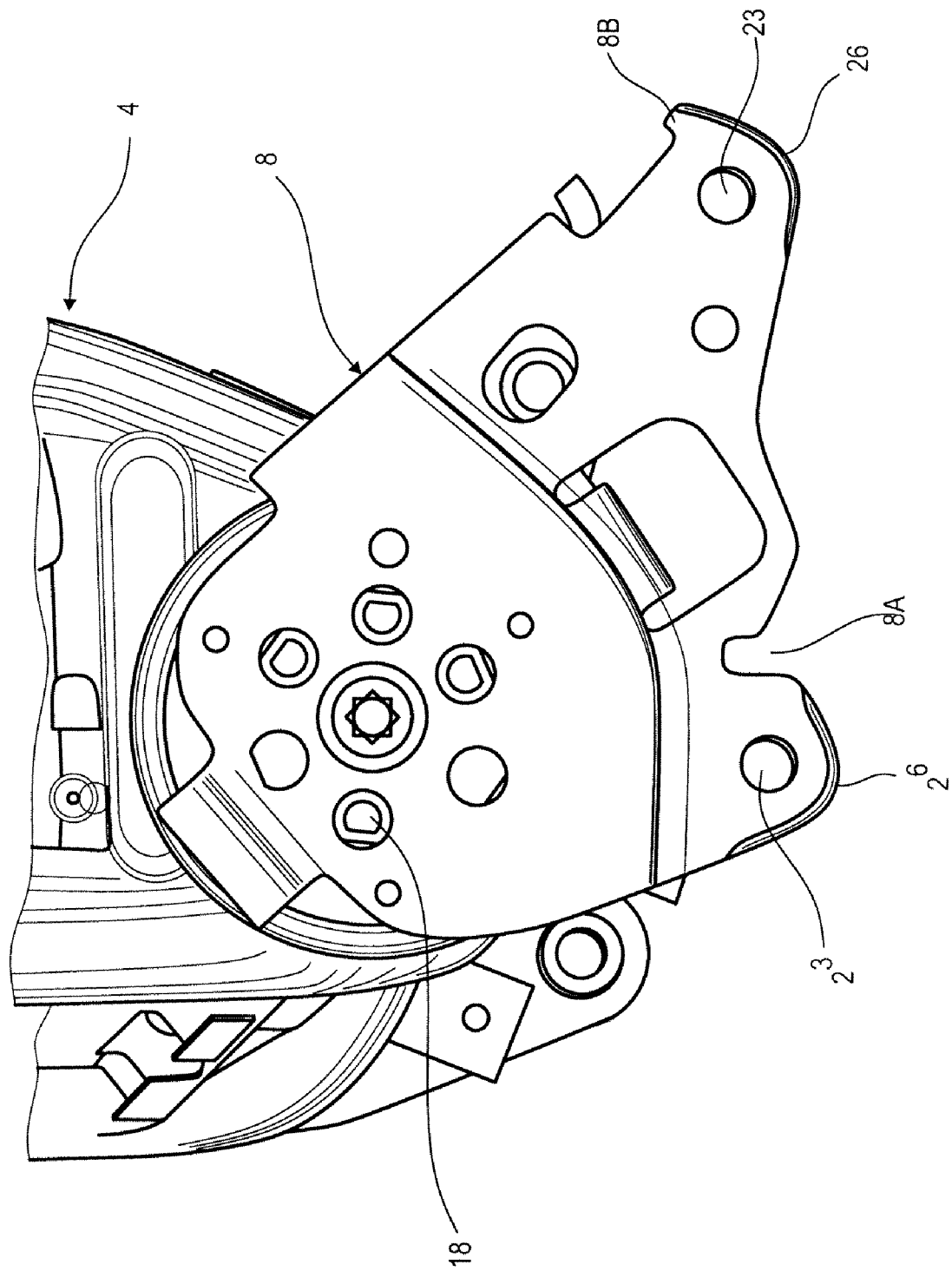
FIG. 4 shows a partial illustration of the back rest frame together with the fitting with introductory bevels formed on the edge of the latter.

In order to simplify the assembly, respective assembly aids are provided on the fitting 8 and on the seat frame 6. The assembly aids in this case are structural auxiliary elements which are formed integrally on the fitting 8 and on the seat frame 6. The configuration and operation of the assembly aids are explained in more detail below with reference to FIGS. 2 to 4.

When the back rest frame 4 with the fitting 8 fastened thereto is placed onto the seat frame 6, the two frame parts 4, 6 are automatically brought into the defined assembly aid position. The assembly aid position is formed here in such a manner that the holes 23 on the fitting 8 are aligned with the associated holes 22 on the seat frame 6, and therefore the screw can be passed through the mutually aligned holes 22, 23.

In this case, an edge recess 8A and an edge-side lug 8B are provided on the fitting as assembly aids. These assembly aids 8A, 8B are already formed during the process to produce the fitting 8, for example during a punching operation which defines the outer contour of the fitting 8. Therefore, for the formation of said assembly aids 8A, 8B, preferably no additional production costs are incurred.

On the seat frame 6, the assembly aids are formed by a transverse pin 6A and a transverse tab 6B. The transverse pin 6A is formed here by a tab which is outwardly bent in the transverse direction or Y direction from the side cheek 14. The transverse tab 6B, in turn, is formed by a doubled-over portion on the edge of the side cheek 14. Said doubled-over portion is formed over wide parts of the side cheek 14 and is interrupted only in the region of the fitting 8. At this point, it therefore has a type of introductory opening for the fitting 8. The width of the introductory opening is matched to the width of the fitting 8, to be precise in such a manner that the lug 8B engages behind the doubled-over portion.

The edge recess 8A and the transverse pin 6A and also the lug 8B and the transverse tab 6B respectively form pairs of assembly aids 8A, 6A and 8B, 6B. These two pairs each interact and form a form-fitting connection with one another. A fixing of the back rest frame 4 relative to the seat frame 6 in the Z direction and in the X direction is already achieved by means of the edge recess 8A and the transverse pin 6A. The additional pair of assembly aids, comprising lug 8B and transverse tab 6B, serves as a means of securing against rotation such that the back rest frame 4 does not rotate away to the rear at an axis of rotation defined by the transverse pin 6A because of its dead weight. Overall, the assembly aids 8A, 6A; 8B, 6B therefore ensure a secure, form-fitting fixing in the assembly aid position. The fixing in the Y direction is achieved by the edge-side arrangement of the fitting 8. As can be seen in particular from FIG. 3 and FIG. 4, the fitting 8 is arranged on the outside of the back rest frame 4 and is bent inward with respect to its lower subregion which is oriented with respect to the seat frame 6, and therefore the fitting 8 bears against the inside of the side cheek 14 of the seat frame 6. In order to permit simple introduction of the two opposite fittings 8 between the opposite side cheeks 14 of the seat frame 6, introductory bevels 26 are formed on the edge side of the fitting 8. The introductory bevels 26 are formed in this case on the subregions which protrude approximately in the Z direction, and the fitting 8 is introduced with them in front. In order to form the introductory bevels 26, an encircling outer edge of the fitting 8 is beveled at least in some regions.

The assembly operation takes place in such a manner that the back rest frame 4 is first of all placed from above onto the seat frame 6 approximately counter to the Z direction. In this case, a pushing rotational movement, i.e., a push-in movement combined with a small rotational movement, is provided. As a result, first of all the stop 8 with its lug 8B in front is guided under the doubled-over portion of the seat frame 8, which doubled-over portion forms the transverse tab 6, in order to form here a form-fitting engagement behind. The edge recess 8A is subsequently pushed or pivoted over the transverse pin 6A. The transverse pin 6A rests in the edge recess 8A and the lug 8B is supported on the lower side of the transverse tab 6B. By means of simple placing-on of the back rest frame 4, an assembly aid position is therefore taken up, in which the two frame parts 4, 6 are fixed in their position with respect to each other. This assembly aid position is retained by means of the dead weight of the back rest frame 4.

In the next step, a respective screw (not illustrated in FIG. 3) is passed through the mutually aligned holes 22, 23, which are formed firstly in the front region in the vicinity of the transverse tab 6B and of the lug 8B and secondly in the rear region in the vicinity of the transverse pin 6A and of the edge recess 8A, and is tightened.

The position and orientation of the assembly aids 8A, 8B; 6A, 6B are selected here in such a manner that, when the screws are tightened, an automatic self-alignment of the back rest frame 4 relative to the seat frame 6 takes place, to be precise in such a manner that a final assembly position is taken up (not illustrated). In this final assembly position, the individual pairs of assembly aids 8A, 6A; 8B, 6B are decoupled from each other, i.e., they are no longer in contact. By this means, annoying noises during the normal driving mode are avoided.

In order to achieve this self-alignment during the tightening of the screws, the mutually corresponding holes 22, 23, for example, are not exactly aligned with each other in the assembly aid position. The center axes of the individual holes 22, 23 therefore have a certain offset with respect to each other, and therefore, during tightening, the two center axes are brought into alignment and the final assembly position is therefore automatically taken up.

In this case, the tolerances and the arrangement and also configuration of the pairs of assembly aids 8A, 6A; 8B, 6B are preferably selected in such a manner that, during tightening of the front screw which is passed through in the region of the lug 8B, the rear holes 22, 23 are automatically aligned with each other. That is to say, by means of a first screwing operation, a rotational or else a displacement movement of the back rest frame 4 is forced, which leads to the precise alignment of the second, in particular rear, holes 22, 23. Subsequently, a further screw is then guided through the second screw holes 22, 23 and tightened.

By means of the additional assembly aids 8A, 6A; 8B, 6B, overall the outlay on positioning during the assembly is reduced. A manual alignment is no longer required in order to bring the holes 22, 23 into overlap. Also, by means of the means for securing against rotation, which is obtained, in the exemplary embodiment, by the interaction of the lug 8B with the transverse tab 6B, improved occupational safety is achieved, since the back rest frame 4 cannot tip over rearward. It is of particular advantage here that said assembly aids are obtained by simple punching and deforming operations on components which already exist, and therefore the provision of said assembly aids takes place in a cost-neutral manner and no further additional component is required. Finally, it is also of particular importance that, in the final assembly position, the assembly aids are decoupled from each other such that no annoying noises occur during the normal driving mode.

What is claimed is:

1. A vehicle seat comprising:
   two frame parts comprising a back rest frame and a seat frame, wherein the two frame parts are adapted to be fastened to each other via a fitting with the aid of fastening elements,
   wherein an X direction is along a longitudinal direction of the seat frame, a Z direction is perpendicular to the X direction and oriented along a longitudinal direction of the back rest frame, and a Y direction is oriented transversely both with respect to the X direction and the Z direction,
   wherein at least one of the frame parts and the fitting have mutually corresponding fastening points that are exactly aligned with each other in a final assembly position,
   wherein assembly aids are provided on at least one frame part and on the fitting, such that an assembly aid on the at least one frame part and an assembly aid on the fitting form a first pair of assembly aids and engage one inside the other in a form-fitting manner,
   wherein the vehicle seat comprises a second pair of assembly aids,
   wherein the first and second pairs of assembly aids form form-fitting connections that are effective in inhibiting motions in different directions,
   wherein the first and second pairs of assembly aids are configured so that the two frame parts and the fitting are held in an assembly aid position in which the mutually corresponding fastening points are aligned with each other for fastening via the fastening elements, but the corresponding fastening points are not exactly aligned with each other,
   wherein the assembly aids are arranged with respect to the fastening points in such a manner that, during fastening via the fastening elements, the frame and the fitting take up the final assembly position, which is changed in relation to the assembly aid position, so that the assembly aids in each respective pair of assembly aids are separated from each other.

2. The vehicle seat according to claim 1, wherein the pair of assembly aids is formed by an edge recess and a transverse pin that can be displaced one inside the other essentially in a Z direction in order to form a form-fitting connection that is effective in inhibiting a motion in an X direction.

3. The vehicle seat according to claim 1, wherein the second pair of assembly aids opposes a rotation of the fitting in relation to the frame part.

4. The vehicle seat according to claim 1, wherein the second pair of assembly aids forms a form-fitting connection that is effective in a Z direction.

5. The vehicle seat according to claim 4, wherein the transverse tab is formed by a doubled-over portion of a side cheek of the frame part.

6. The vehicle seat according to claim 1, wherein the second pair of assembly aids is formed by a transverse tab extending in a Y direction and a stop, which engage together one behind the other in the assembly aid position.

7. The vehicle seat according to claim 1, wherein the fitting and/or the frame part have/has an introductory bevel on its/their edge oriented toward the other part.

8. The vehicle seat according to claim 1, wherein the frame part is the seat frame and the fitting is fastened in preassembled form to the back rest frame.

* * * * *